(12) United States Patent
Steijner

(10) Patent No.: US 7,671,286 B2
(45) Date of Patent: Mar. 2, 2010

(54) KEY WITH VARIABLE POSITION CAPABILITY

(75) Inventor: Magnus Steijner, Loddekopinge (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 11/768,386

(22) Filed: Jun. 26, 2007

(65) Prior Publication Data
US 2009/0000936 A1    Jan. 1, 2009

(51) Int. Cl.
*H01H 9/00* (2006.01)
(52) U.S. Cl. .................. 200/5 A; 200/345
(58) Field of Classification Search .......... 200/5 A, 200/341–345, 4, 43.18, 43.16, 318.2
See application file for complete search history.

(56) References Cited

U.S. PATENT DOCUMENTS

| | | | |
|---|---|---|---|
| 4,361,373 A * | 11/1982 | Gallusser et al. ............. 439/312 |
| 5,803,237 A * | 9/1998 | Gandre et al. ............. 200/43.01 |
| 6,094,191 A | 7/2000 | Watanabe et al. |
| 6,201,199 B1 * | 3/2001 | Chew et al. ................. 200/318 |
| 6,653,585 B2 | 11/2003 | Chun |
| 6,752,551 B1 | 6/2004 | Hagerman |
| 6,930,263 B2 * | 8/2005 | Hung ....................... 200/61.62 |
| 7,057,127 B1 * | 6/2006 | Kuan ........................ 200/334 |
| 2002/0148711 A1 | 10/2002 | Hsu et al. |
| 2003/0188960 A1 | 10/2003 | Hsu |
| 2007/0122144 A1 | 5/2007 | Han |

FOREIGN PATENT DOCUMENTS

EP     0 754 995 A2    1/1997

OTHER PUBLICATIONS

International Search Report and Written Opinion dated Jul. 31, 2008 issued in corresponding PCT application No. PCT/IB2007/055297, 13 pages.

* cited by examiner

*Primary Examiner*—Kyung Lee
(74) *Attorney, Agent, or Firm*—Harrity & Harrity, LLP

(57) ABSTRACT

A device may include a key having a key head and an actuator configured to move and to change a position of the key head when the actuator moves, where the actuator is configured to change the position of the key head to a first key position, and when the key head is at the first key head position, the key, when at a depressed position, cannot provide a connection with respect to an electrical interface.

20 Claims, 12 Drawing Sheets

KEY WITH VARIABLE POSITION CAPABILITY

BACKGROUND

The proliferation of devices, such as handheld, portable, and stationary devices has grown tremendously within the past decade. Each of these devices may include an input device, such as an arrangement of keys. While some keys may be labeled to assist a user when operating a device, other keys may not be labeled. Nevertheless, even when the keys are labeled, a user of a device may not be looking at the label or the key when operating the device. Rather, a user may be relying on his/her sense of touch and familiarity with the device and the key. In such an instance, a user's ability to operate a device and select a key may be problematic.

SUMMARY

According to one aspect, a device may include a key having a key head, and an actuator configured to move and to change a position of the key head when the actuator moves, where the actuator is configured to change the position of the key head to a first key head position and to a second key head position, and when the key head is at the first key head position, the key cannot provide a connection with respect to an electrical interface.

Additionally, the actuator may change the position of the key head to the first key head position by moving in a direction that is perpendicular to a direction the key head is configured to move when being depressed.

Additionally, the actuator may change the position of the key head to the second key head position, and when the key head is at the second key head position, the key can provide a connection with respect to the electrical interface.

Additionally, the actuator may change the position of the key head to the second key head position by moving in a direction that is perpendicular to a direction that the key head is configured to move when being depressed.

Additionally, the actuator may move to a first actuator position when changing the position of the key head to the first key head position, and the actuator may move to a second actuator position when changing the position of the key head to the second key head position.

Additionally, the actuator may move in a first direction when changing the position of the key head to the first key head position, and the actuator may move in a second direction when changing the position of the key head to the second key head position, where the first direction is opposite to the second direction.

Additionally, the actuator may change the position of the key head to the second key head position, in which the key head protrudes further away from a housing of the device than when the key head is at the first key head position.

Additionally, the actuator may move based on a moving of a cover of the device.

According to another aspect, a device may include a key head configured to move in a first direction and a second direction, and an actuator configured to move in a third direction and a fourth direction, the third direction and the fourth direction each being perpendicular to the first direction and the second direction, the actuator configured to change a position of the key head when the actuator moves, where the actuator moves to a first actuator position or to a second actuator position, and when the actuator is at the first actuator position, the key head cannot provide a connection with respect to an electrical interface.

Additionally, the key head may move to a first key head position when moving in the first direction, and to a second key head position when moving in the second direction.

Additionally, the key head may move to the first key head position in correspondence to when the actuator moves to the first actuator position.

Additionally, the key head may move to the second key head position in correspondence to when the actuator moves to the second actuator position.

Additionally, the key head may protrude further away from a housing of the device when at the second position than when the key head is at the first key head position.

Additionally, the device may include an actuator mover configured to move the actuator to the first actuator position and to the second actuator position.

Additionally, the actuator mover may move the actuator based on one of a mode of the device, an execution of an application program, a selection of another key, an accessing of data in a memory, or an opening or a closing of a cover of the device.

According to still another aspect, a device may include a key including a key head, and an actuator that is configured to change the position of the key head to a first key head position and a second key head position, and when the key head is at the first key head position or the second key head position, the key can provide a connection with respect to an electrical interface.

Additionally, the key may further include a key leg, and the actuator may include a guide track, where the key leg of the key connects to the guide track, and when the actuator moves to a first actuator position, the key head correspondingly moves to the first key head position, and when the actuator moves to a second actuator position, the key head correspondingly moves to the second key head position.

Additionally, the actuator may move in a first direction to change the position of the key head to the first key head position, and may move in a second direction to change the position of the key head to the second key head position, where the first direction is opposite to the second direction.

According to yet another aspect, a device may include a key including a key head, and means for changing the position of the key head to a first key head position and a second key head position, such that when the key head is at the first key head position, the key cannot provide a connection with respect to an electrical interface.

Additionally, when the key head is at the second key head position, the key can provide a connection with respect to the electrical interface.

BRIEF DESCRIPTION OF THE DRAWINGS

The accompanying drawings, which are incorporated in and constitute a part of this specification, illustrate exemplary embodiments described herein and, together with the description, explain these exemplary embodiments. In the drawings.

DETAILED DESCRIPTION

The following detailed description refers to the accompanying drawings. The same reference numbers in different drawings may identify the same or similar elements. Also, the following description does not limit the invention.

Overview

Implementations described herein may provide a device having a key with a variable key level. The key may include a moving actuator that is capable of changing a level of the key while other components associated with the key, such as a printed circuit board (PCB) or a switching component, remain stationary. In one implementation, the key may be a two position key having, for example, a low position (e.g., level) and a high position (e.g., level). In another implementation, the key may be a three position key having, for example, a low level, a medium level, and a high level.

The actuator may move based on, for example, an actuator mover. The actuator mover may cause the actuator to move based on various device operations, such as the mode of the device, an execution of a program, or a user's interaction with the device (e.g., use of another key or moving a cover of the device). For example, a key may pop-up when a certain functionality associated with the key should be available (e.g., a camera key popping up when a device is in a camera mode). In this way, a user of a device may be less likely to unintentionally press a wrong key and more apt to press the key that has, for example popped-up.

Exemplary Device

Figure 1A:
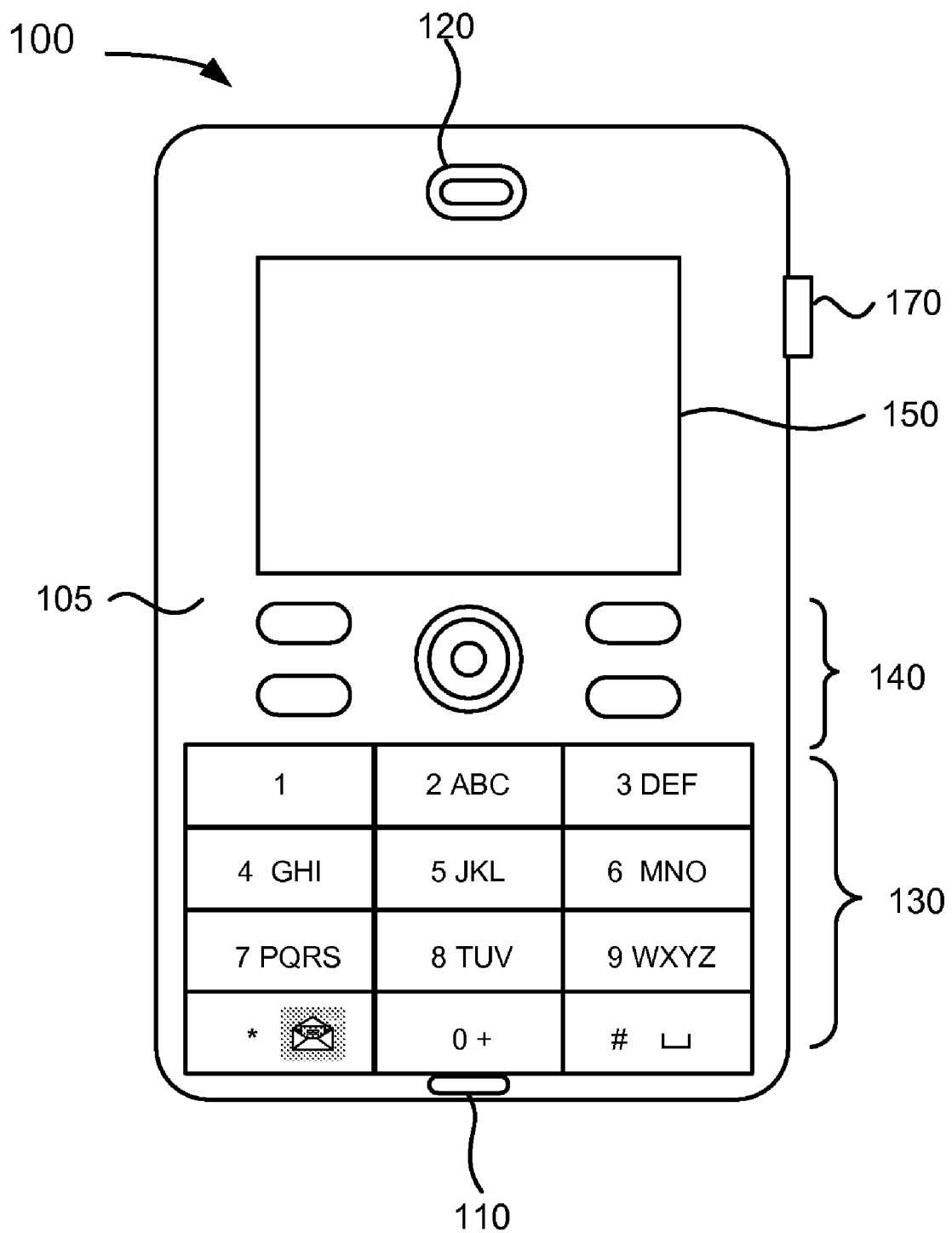
FIG. 1a is a diagram illustrating a front view of external components of an exemplary device having variable key level capability.

FIG. 1a is a diagram illustrating a front view of external components of an exemplary device having variable key level capability. As illustrated in FIG. 1a, device 100 may include a housing 105, a microphone 110, a speaker 120, a keypad 130, function keys 140, a display 150, and a camera button 170.

Housing 105 may include a structure configured to contain devices and components of device 100. For example, housing 105 may be formed from plastic and configured to support microphone 110, speaker 120, keypad 130, function keys 140, display 150, and camera button 170.

Microphone 110 may include any component capable of receiving auditory information, such as a user's voice. Speaker 120 may include any component capable of transmitting auditory information, such as a sound file.

Keypad 130 may include any component capable of providing input to device 100. Keypad 130 may include a standard telephone keypad. Keypad 130 may also include one or more special purpose keys. In one implementation, each key of keypad 130 may be, for example, a pushbutton. A user may utilize keypad 130 for entering information, such as text or a phone number, or activating a special function.

Function keys 140 may include any component capable of providing input to device 100. Function keys 140 may include a key that permits a user to cause device 100 to perform one or more operations, such as placing a phone call, playing various media, or accessing an application. Function keys 140 may include a key that provides a cursor function and an enter function. In one implementation, each key of function keys 140 may be, for example, a pushbutton.

Display 150 may include any component capable of providing visual information. Display 150 may be utilized to display, for example, text, images, and/or video information. Camera button 170 may be a pushbutton for taking pictures or capturing video.

Since device 100 illustrated in FIG. 1 is exemplary in nature, device 100 is intended to be broadly interpreted to include any type of electronic device that includes a user input component. For example, device 100 may include a wireless phone, a personal digital assistant (PDA), a handheld computer, an image capturing device (e.g., a camera), a calculator, a wristwatch, an audio player (e.g., an MP3 player), or an audio-visual (AV) player/recorder device (e.g., a DVD player or a camcorder). In other instances, device 100 may include medical devices, vehicle mounted devices, aircraft mounted devices, desktop devices, etc. Accordingly, although FIG. 1 illustrates exemplary external components of device 100, in other implementations, device 100 may contain fewer, different, or additional external components than the external components depicted in FIG. 1. Additionally, or alternatively, one or more external components of device 100 may include the capabilities of one or more other external components of device 100. For example, display 150 may be an input component (e.g., a touch screen). Additionally, or alternatively, the external components may be arranged differently than the external components depicted in FIG. 1.

Any or all of the keys of device 100, as described above, may have variable key level capability. That is, any of the keys of keypad 130, function keys 140, and camera button 170 may have variable key level capability. However, for purposes of discussion, the description to follow will be describing an exemplary variable key level capability as it relates to camera button 170.

Figure 1B:
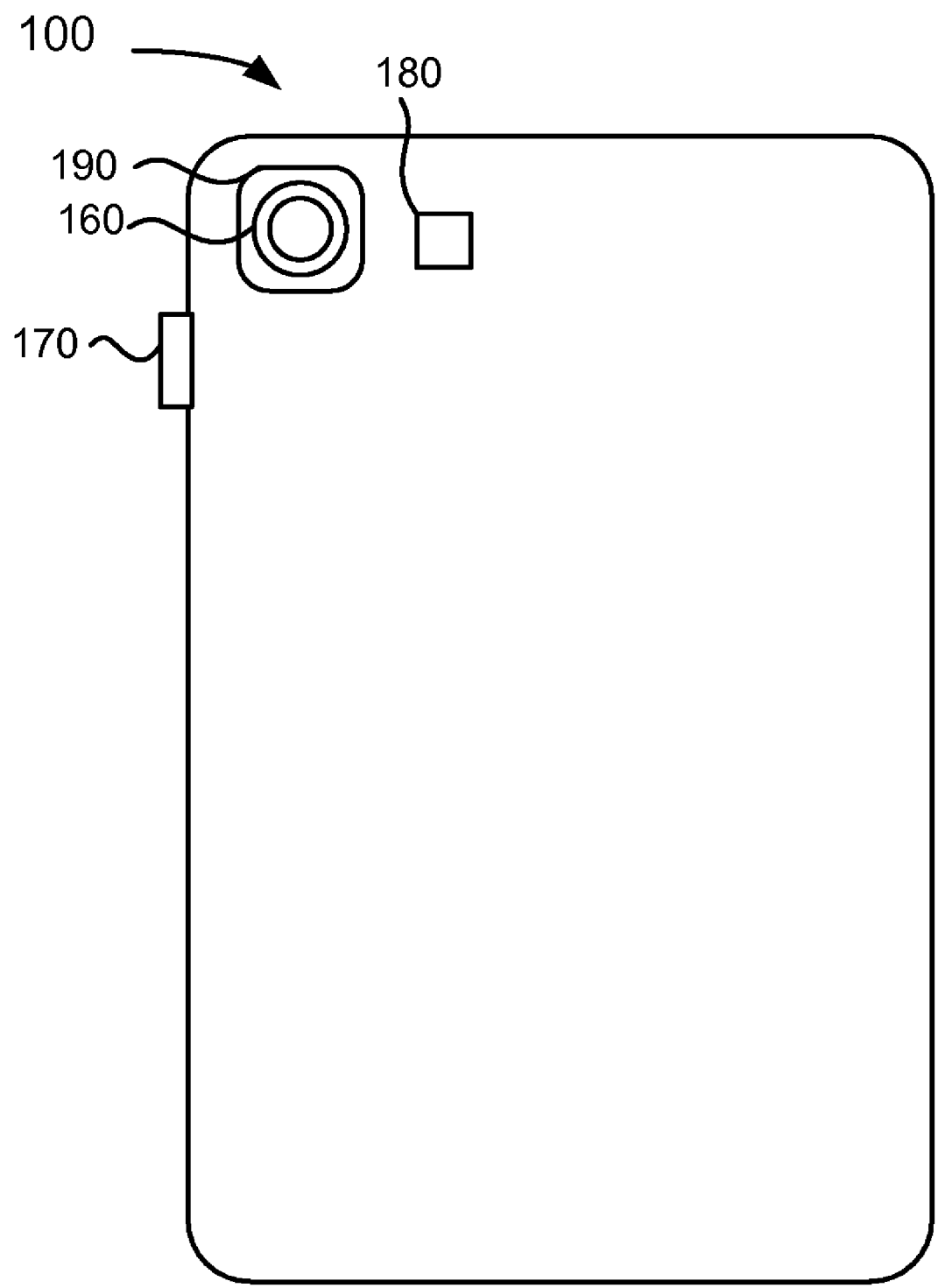
FIG. 1b is a diagram illustrating a rear view of external components of the exemplary device.

FIG. 1b is a diagram illustrating a rear view of external components of the exemplary device. As illustrated, in addition to the components previously described, device 100 may include a camera 160, a light emitting diode (LED) flash 180 and a camera cover 190. Camera 160 may include any component capable of capturing image data, such as a picture or video. LED flash 180 may emit light when a user of device 100 captures an image. Camera cover 190 may be a cover capable of sliding to a position so as to expose or cover a lens of camera 160.

Figure 2:
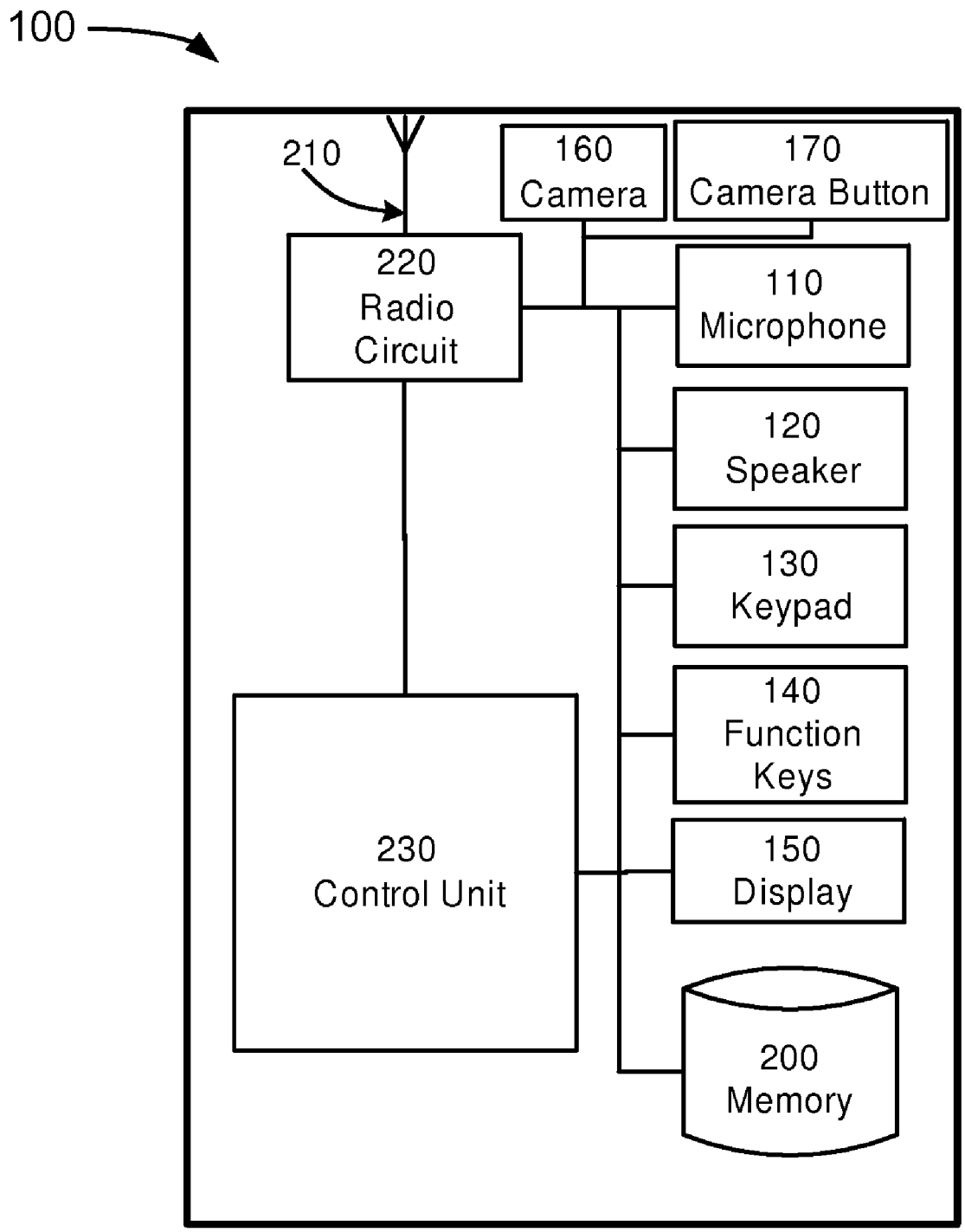
FIG. 2 is a diagram illustrating internal components of the exemplary device.

FIG. 2 is a diagram illustrating internal components of the exemplary device. As illustrated, device 100 may include microphone 110, speaker 120, keypad 130, function keys 140, display 150, camera 160, camera button 170, a memory 200, an antenna 210, a radio circuit 220, and a control unit 230. No further description of microphone 110, speaker 120, keypad 130, function keys 140, display 150, camera 160, and camera button 170 is provided with respect to FIG. 2.

Memory 200 may include any type of storing component to store data and instructions related to the operation and use of device 100. For example, memory 200 may include a memory component, such as a random access memory (RAM), a read only memory (ROM), and/or a programmable read only memory (PROM). Additionally, memory 200 may include a storage component, such as a magnetic storage component (e.g., a hard drive) or other type of computer-readable medium. Memory 200 may also include an external storing component, such as a Universal Serial Bus (USB) memory stick, or a Subscriber Identity Module (SIM) card.

Antenna 210 and radio circuit 220 may include any component for enabling radio communication with, for example, a network or another device. Radio circuit 220 may include, for example, a transceiver capable of transmitting and receiving information.

Control unit 230 may include any logic that may interpret and execute instructions, and control the overall operation of device 100. Logic, as used herein, may include hardware, software, and/or a combination of hardware and software. Control unit 230 may include, for example, a general purpose processor, a microprocessor, a data processor, a co-processor, and/or a network processor. Control unit 230 may access instructions from memory 200, from other components of device 100, and/or from a source external to device 100 (e.g., a network or another device).

Although FIG. 2 illustrates exemplary internal components, in other implementations, device 100 may include fewer, additional, and/or different components than the exemplary internal components depicted in FIG. 2. In still other implementations, one or more internal components of device 100 may include the capabilities of one or more other components of device 100. For example, radio circuit 220 and/or control unit 230 may include their own on-board memory 200.

Figure 3A:
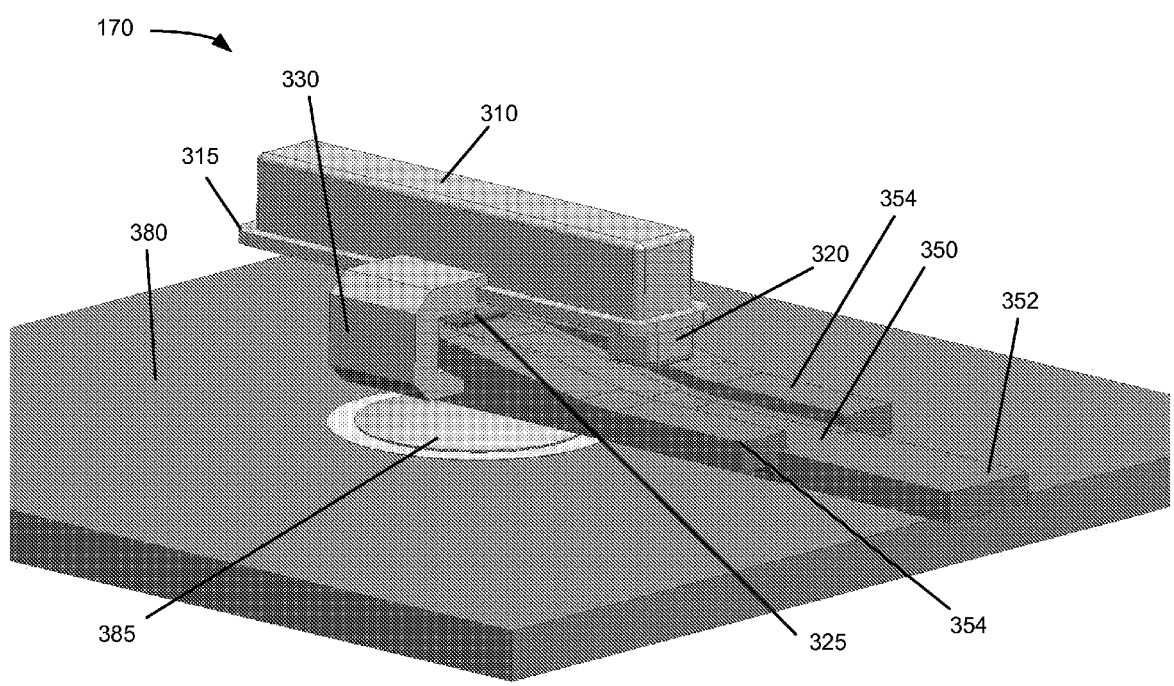
FIG. 3a is a diagram illustrating a partial front view of a first exemplary camera button.

FIG. 3a is a diagram illustrating a partial front view of a first exemplary camera button. As illustrated, camera button 170 may include a key head 310, a key head lip 315, a stabilizer 320, a presser 325, key legs 330, and an actuator 350 having, among other things, an actuator base 352 and actuator fins 354. A printed circuit board (PCB) 380 with a dome 385 is also illustrated.

Key head 310 may be, for example, a cap. Key head 310 may be made from plastic, ceramic, rubber, metal, etc. Key head 310 may be configured to cause an electrical connection to be formed when a user of device 100 depresses key head 310. As illustrated in FIG. 3a, key head 310 may have a rectangular shape. In other implementations, key head 310 may be any number of other shapes, such as square, circular, or triangular. The surface of key head 310 may be labeled or unlabeled. The depth of key head 310 may vary depending on a number of factors, such as the thickness of housing 105, the extent to which key head 310 may protrude from and/or retract within housing 105 (as will be described below), and/or the overall height of device 100. Similarly, the dimensions of key head 310 may vary depending on factors such as space available on device 100, location on device 100 (e.g., located on the front or the side of device 100), importance (e.g., more important keys may have a larger key head 310), etc.

Key head lip 315 may be a projecting edge that protrudes from a bottom surface of key head 310, and may have a similar shape to key head 310, as illustrated in FIG. 3a. Key head lip 315 may provide support for camera button 170 by contacting housing 105. Key head lip 315 may be made from plastic, ceramic, rubber, metal, etc., and the dimensions and depth of key head lip 315 may vary depending on factors analogous to those described above with respect to key head 310.

Stabilizer 320 may be a nodule that protrudes from a bottom surface of key head lip 315. Stabilizer 320 may be made from plastic, ceramic, rubber, metal, etc. As illustrated, stabilizer 320 may be cubical in shape. As will be described below, stabilizer 320 may stabilize key head 110 when camera button 170 is at one or more positions. Accordingly, in other implementations, the shape and dimensions of stabilizer 320 may vary depending on the shape and dimensions of other components of camera button 170.

Presser 325 may be a nodule that protrudes from a bottom surface of key head lip 315. Presser 325 may be made from plastic, ceramic, rubber, metal, etc. As will be described below, presser 325 may work in cooperation with key head 310 and actuator 350 to provide, for example, an electrical connection when key head 310 is depressed by a user of device 100.

Key legs 330 may be made from plastic, ceramic, rubber, metal, etc. As illustrated, in this example, key legs 330 may have a "C-shaped" configuration. In other implementation, key legs 330 may have a configuration different than a "C-shape." Although not entirely illustrated, key legs 330 may be formed in a symmetrical fashion with respect to key head 310. A top portion of the "C-shape" may extend from key head 310 and key head lip 315, and a bottom portion of the "C-shape" may extend toward actuator 350. As will be described in greater detail below, the bottom portion of key legs 330 may cooperate with actuator 350 to provide camera button 170 with variable key level capability.

Actuator 350 may be made from plastic, ceramic, rubber, metal, etc. As illustrated, in this example, actuator 350 may include actuator base 352 that has a generally rectangular shape. Actuator fins 354 may be formed from actuator base 352 in a symmetrical fashion. Both actuator base 352 and actuator fins 354 may be formed to have a rising slope in which a first end may have a thickness that is less than a second end. As will be described below, the rising slope of actuator base 352 and actuator fins 354 may correspond to a track that may be formed on side surfaces of actuator fins 354.

The bottom portion of the "C-shape" of key legs 330 may extend to the side surfaces of actuator fins 354. In this example, as will be described below, key legs 330 may cooperate with actuator fins 354 to provide a movement of key head 310. Further, as will be described below, actuator 350 may be capable of movement. In other implementations, actuator 350 may be formed differently.

PCB 380 may be any conventional type of electrical circuit board. In this example, PCP 380 may include dome 385. Dome 385 may be a flexible member (e.g. layer) capable of establishing a connection on PCB 380, as will be described below.

Figure 3B:
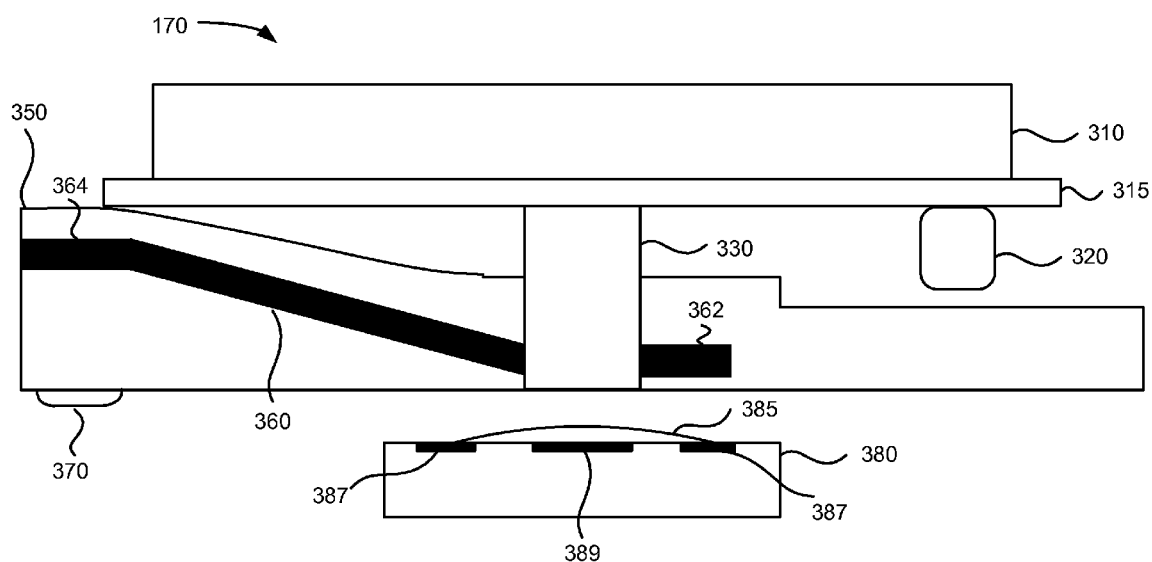
FIG. 3b is a diagram illustrating a side view of the first exemplary camera button at a low level.

Although FIG. 3a illustrates exemplary components of camera button 170, in other implementations, camera button 170 may include fewer, additional, and/or different components than the components depicted in FIG. 3a. In still other implementations, one or more components of camera button 170 may include the capabilities of one or more other components of camera button 170. Additionally, in other implementations, the electrical interface, such as PCB 380 and dome 385 may be replaced by, for example, a switch component, a flexible circuit board, etc FIG. 3b is a diagram illustrating a side view of the first exemplary camera button at a low level. In addition to the components previously described in FIG. 3a, camera button 170 may include a guide track 360 with a level 362 and a level 364, and a knob 370. In addition, FIG. 3b illustrates that PCB 380 includes outer pads 387 and inner pad 389.

Guide track 360 may be a recess for which key legs 330 may reside. As illustrated in FIG. 3b, guide track 360 may be configured to have a rising slope with respect to PCB 380 and dome 385. The rising slope may correspond to the rising slope of actuator base 352 and actuator fins 354, as previously described. In this example, guide track 360 may include level 362 and level 364. Level 362 may be considered a low level and level 364 may be considered a high level with respect to PCB 380 and dome 385.

Knob 370 may be formed on a bottom surface of actuator base 352. Knob 370 may be made from the same material as actuator 350. Knob 370 may be a contact point for key head 310 to dome 385 of PCB 380. In this example, knob 370 may be a circular. In other implementations the shape and dimensions of knob 370 may vary depending on, for example, the shape and dimensions of dome 385 and space available between knob 370 and the electrical interface, such as PCB 380.

Outer pads 387 and inner pad 389 may be, for example, a conductive metal residing on PCB 380. In one implementation, outer pads 387 and inner pad 389 may each be one pad. In other implementations, outer pads 387 and inner pad 389 may each be more than one pad. As illustrated, a space may exist between dome 385 and inner pad 389. As will be described below, when dome 385 contacts inner pad 389, an electrical connection is established.

As illustrated, when key legs 330 reside in guide track 360 at level 362, camera button 170 may be at a low level. One portion of key head 310 and key lip 315 may be in close proximity to an upper surface of actuator 350. Similarly, at an opposing portion of key head 310 and key lip 315 may extend stabilizer 320, and may be in close proximity to an upper surface of actuator 350. Stabilizer 320, among other things, may stabilize key head 310, key lip 315, and/or other components of camera button 170. As will be further described below, knob 370 may be a distance from PCB 380 and dome 385.

Although FIG. 3b illustrates exemplary components of camera button 170, in other implementations, camera button 170 may include fewer, additional, and/or different components than the components depicted in FIG. 3b. For example, in one implementation, knob 370 may be omitted. In another implementation, knob 370 may be attached to a top of dome 385. In either of these implementations, to secure that camera button 170 would not be electrically functional at a certain position; a component (not illustrated) may block actuator 350 from moving in a direction that key head 310 would move when depressed. That is, whether device 100 and/or camera button 170 includes knob 370, actuator 350 may be blocked from moving in a direction that key head 310 would move when depressed so that camera button 170 would not be electrically functional. In still other implementations, one or more components of camera button 170 may include the capabilities of one or more other components of camera button 170.

Figure 3C:
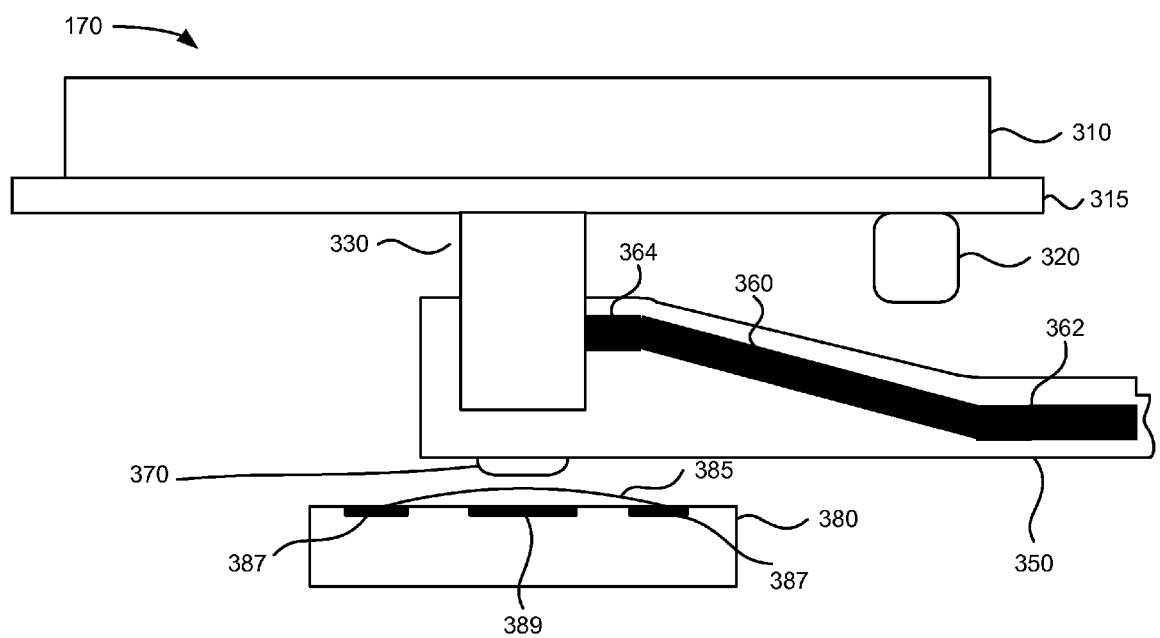
FIG. 3c is a diagram illustrating a side view of the first exemplary camera button at a high level.

FIG. 3c is a diagram illustrating a side view of the first exemplary camera button at a high level. FIG. 3c does not introduce any additional components that have not already been depicted in FIGS. 3a and 3b. Rather, FIG. 3c illustrates, among other things, the change in position of actuator 350 with respect to key head 310, PCB 380, dome 385, and outer pads 387 and inner pad 389.

As illustrated, when key legs 330 reside in guide track 360 at level 364, camera button 170 may be at a high level. Key head 310 and key lip 315, among other components of camera button 170, may be stabilized by housing 105. When camera button 170 is at a high level, key head 310 may protrude a larger distance from housing 105 than when camera button 170 is at a low level. As further illustrated, knob 370 may be in close proximity to, and above and aligned with a center portion of dome 385 and inner pad 389 of PCB 380. As will be described below, there are various ways in which actuator 350 may be moved from the exemplary position depicted in FIG. 3b to the exemplary position depicted in FIG. 3c.

Figure 3D:
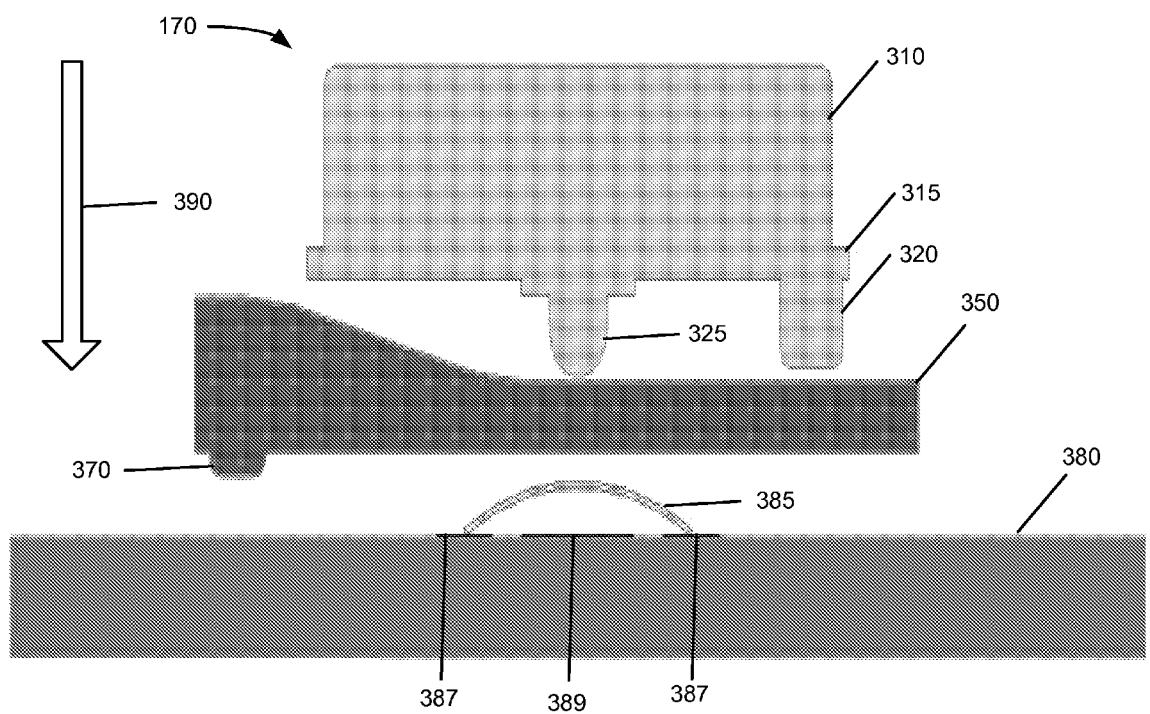
FIG. 3d is a diagram illustrating an exemplary operation of the first exemplary camera button when at a low level.
Figure 3E:
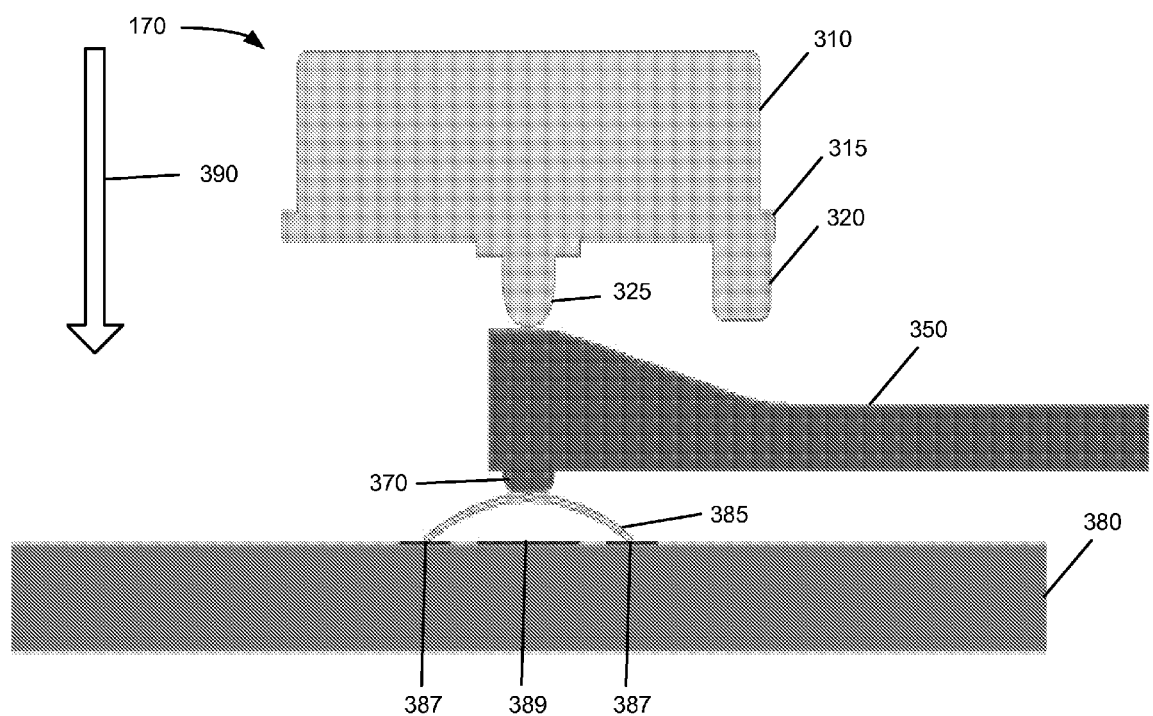
FIG. 3e is a diagram illustrating an exemplary operation of the first exemplary camera button when at a high level.

FIG. 3d is a diagram illustrating an exemplary operation of the first exemplary camera button when at a low level. Depiction of key legs 330 has been omitted, while exposing presser 325 for purposes of discussion. As illustrated and in correspondence to FIG. 3b, in one implementation, when camera button 170 is at a low level, knob 370 may be distant from dome 385. In this instance, when a user of device 100 presses key head 310 in the direction of arrow 390, presser 325 may act upon actuator 350. However, actuator 350 will not cause dome 385 to deform and provide a connection between outer pad 387 and inner pad 389 of PCB 380. In other words, camera button 170 will not work (e.g., the user will not be able to capture a picture or a video) when a user of device 100 presses camera button 170 in the direction of arrow 390, FIG. 3e is a diagram illustrating an exemplary operation of the first exemplary camera button when at a high level. Depiction of key legs 330 has been omitted, while exposing presser 325 for purposes of discussion. As illustrated and in correspondence to FIG. 3c, when camera button 170 is at a high level, knob 370 may be above and aligned with dome 385 and inner pad 389. In this instance, when a user of device 100 presses key head 310 in the direction of arrow 390, presser 325 may act upon actuator 350. However, unlike the instance of FIG. 3d, knob 370 will cause dome 385 to deform and provide a connection between outer pad 387 and inner pad 389 of PCB 380. In other words, camera button 170 will work (e.g., the user will be able to capture a picture or a video) when a user of device 100 presses camera button 170 in the direction of arrow 390.

Figure 3F:
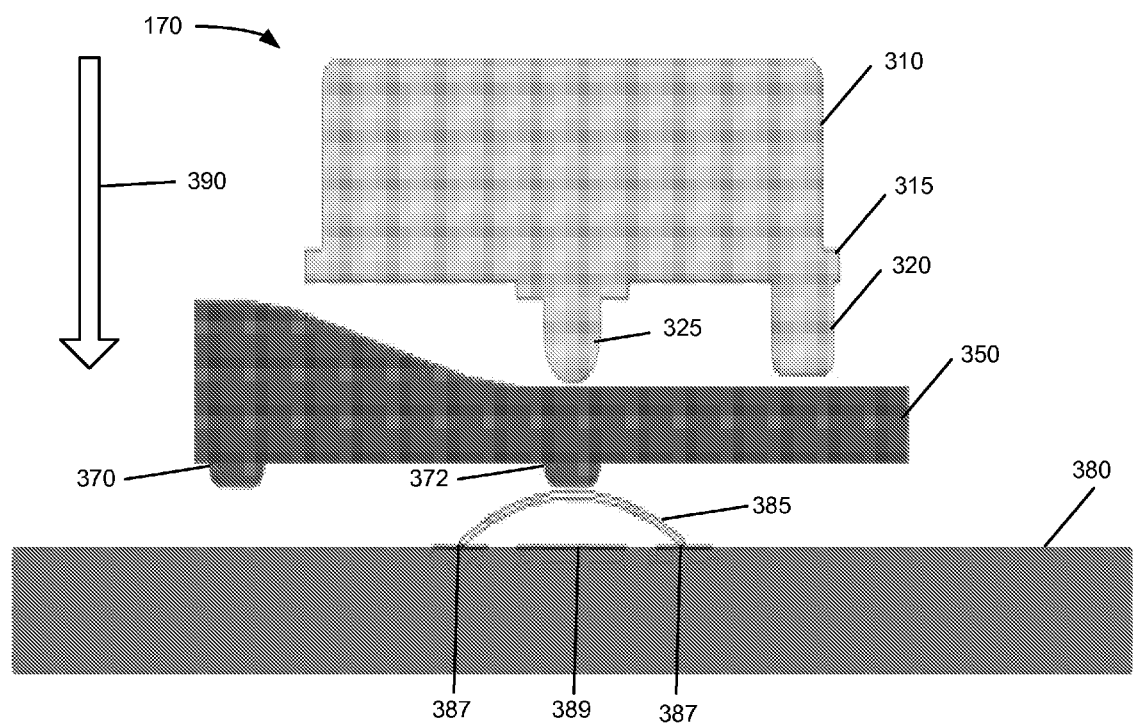
FIG. 3f is a diagram illustrating an exemplary operation of a second exemplary camera button at a low level.

FIG. 3f is a diagram illustrating an exemplary operation of a second exemplary camera button at a low level. Depiction of key legs 330 has been omitted, while exposing presser 325 for purposes of discussion. As illustrated, camera button 170 may include actuator 350 having an additional knob, such as a knob 372. Knob 372 may be similar in shape and material as knob 370. In this instance, when a user of device 100 presses key head 310 in the direction of arrow 390, presser 325 may act upon actuator 350. However, since actuator 350 includes knob 372, knob 372 will cause dome 385 to deform and provide a connection between outer pad 387 and inner pad 389 of PCB 380. In other words, camera button 170 will work when a user of device 100 presses camera button 170 in the direction of arrow 390 even when camera button 170 is at a low level. Similarly, although not illustrated, camera button 170 will also work when camera button is at a high level. That is, knob 370 will cause dome 385 to deform and provide a connection between outer pad 387 and inner pad 389 of PCB 280 when camera button 170 is at a high level.

Figure 4:
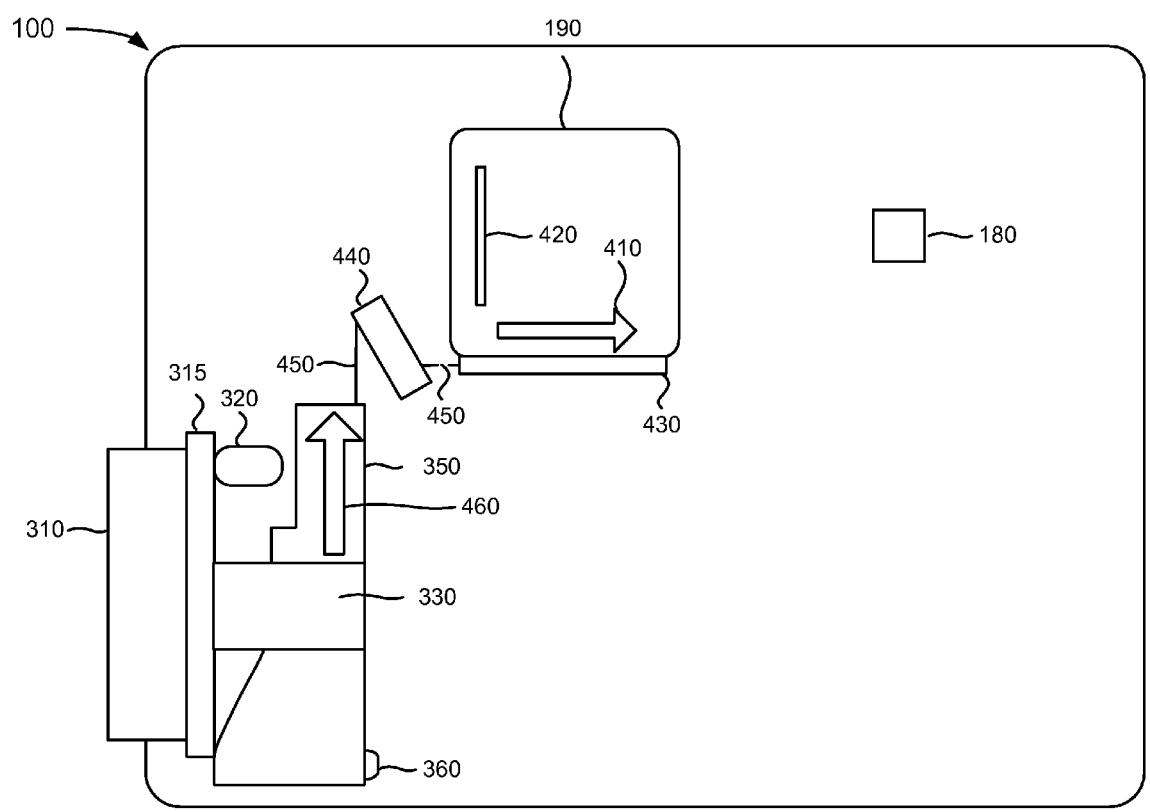
FIG. 4 is a diagram illustrating a rear view of a portion of the exemplary device having a first exemplary actuator mover.

FIG. 4 is a diagram illustrating a rear view of a portion of the exemplary device having a first exemplary actuator mover. For purposes of discussion, internal and external components of device 100 are illustrated. In addition to the components previously described, FIG. 4 illustrates a handle 420, a camera cover fin 430, an actuator mover 440, and connectors 450.

Handle 420 may be a fin for assisting a user of device 100 to open and close camera cover 190. Camera cover fin 430 may be a member protruding from a bottom portion of camera cover 190. Actuator mover 440 and connectors 450 may be components capable of moving actuator 350 based on a movement of camera cover 190. For example, actuator mover 440 and connectors 450 may include, for example, a spring and pulley mechanism.

In an exemplary operation, a user of device 100 may slide camera cover 190 using handle 420 in the direction of arrow 410 to open camera cover 190 (e.g., to expose camera 190 so as to take a picture or a video image). The movement of camera cover 190 may cause camera fin 430 to correspondingly move, which in turn, may cause actuator mover 440 and connectors 450 to move actuator 350 in the direction of arrow 460. In this way, when the user of device 100 opens camera cover 190 to take a picture or a video, key head 310 may change level based on the movement of actuator 350. That is, for example, key head 310 may move from a low level to a high level. Conversely, when the user of device 100 closes camera cover 190, key head 310 may return to a low level.

Although FIG. 4 illustrates exemplary components of a mechanism for moving actuator 350, in other implementations, the mechanism for moving actuator 350 may include fewer, additional, and/or different components than the components depicted in FIG. 4.

Figure 5:
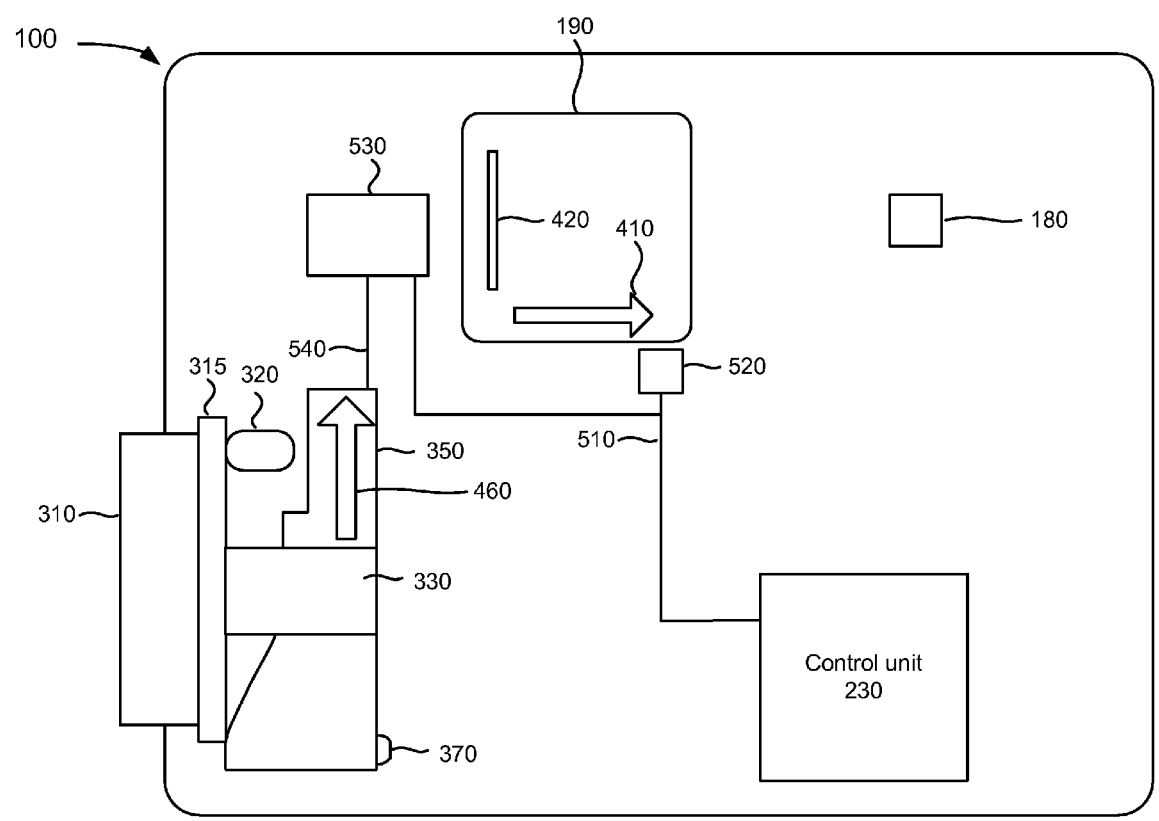
FIG. 5 is a diagram illustrating a rear view of a portion of the exemplary device having a second exemplary actuator mover.

FIG. 5 is a diagram illustrating a rear view of a portion of the exemplary device having a second exemplary actuator mover. For purposes of discussion, internal and external components of device 100 are illustrated. In addition to the components previously described, FIG. 5 illustrates a bus 510, a sensor 520, an actuator mover 530, and a connector 540.

Bus 510 may provide a communication path to which signaling among control unit 230, sensor 520, and actuator mover 530 may occur. Sensor 520 may be any component capable of detecting movement of camera cover 190. Actuator mover 530 and connector 540 may be capable of moving actuator 350. For example, actuator mover 530 may be a motor.

In an exemplary operation, a user of device 100 may slide camera cover 190 using handle 420 in the direction of arrow 410 to open camera cover 190 (e.g., to expose camera 190 so as to take a picture or a video image). The movement of camera cover 190 may be detected by sensor 520. Sensor 520 may output a signal to control unit 230 on bus 510, and in response thereto control unit 230 may operate in a camera mode. Control unit 230 may output a signal to actuator mover 530 on bus 510 to cause actuator 350 to move and key head 310 to change level. In this way, the mode of device 100, based on the opening of camera cover 190, may cause key head 310 to change level (e.g. pop-up).

Although FIG. 5 illustrates exemplary components of a mechanism for moving actuator 350, in other implementations, the mechanism for moving actuator 350 may include fewer, additional, and/or different components than the components depicted in FIG. 5.

Figure 6:
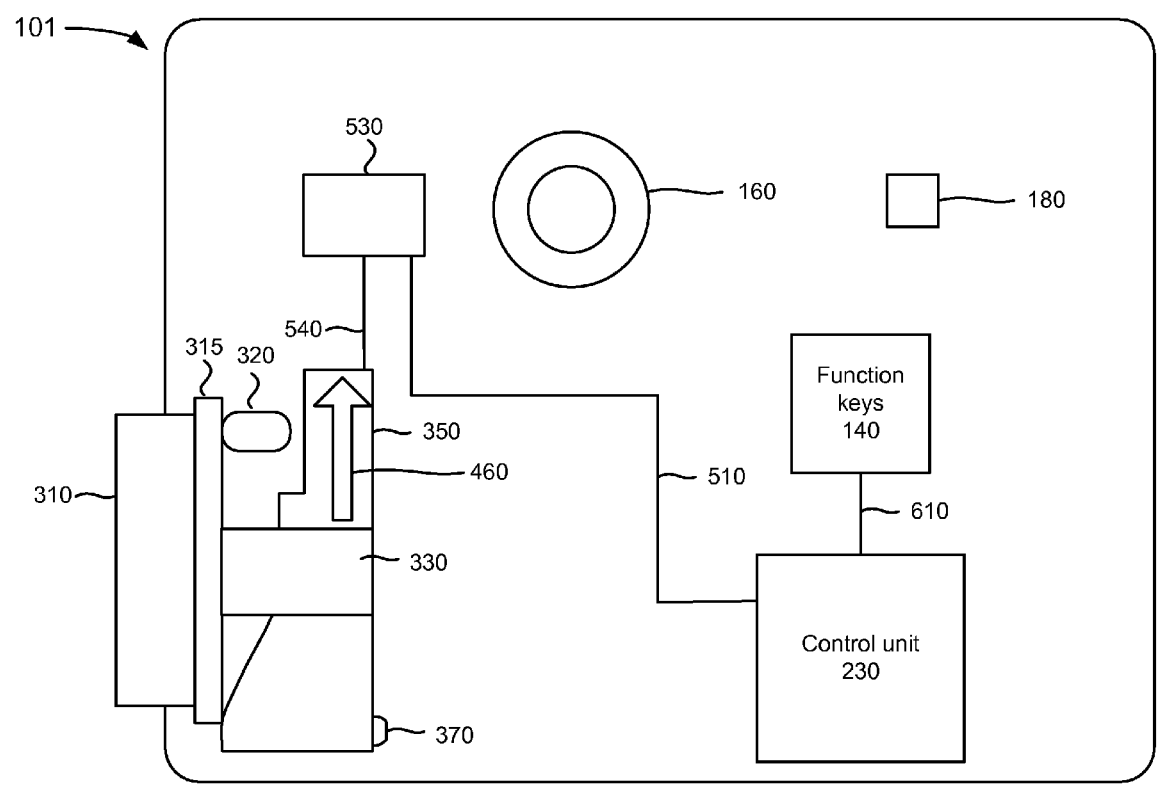
FIG. 6 is a diagram illustrating a rear view of a portion of another exemplary device having the second exemplary actuator mover.

FIG. 6 is a diagram illustrating a rear view of a portion of another exemplary device having the second exemplary actuator mover. Device 101 may be similar to device 100 except that device 101 does not include camera cover 190 and handle 420. As illustrated, bus 610 may provide a communication path between function keys 140 and control unit 230.

In an exemplary operation, a user of device 101 may press a key of function keys 140 so that device 101 operates in camera mode. In response thereto, function keys 140 may output a signal to control unit 230 on bus 610. Control unit 230 may operate in camera mode and output a signal to actuator mover 530 on bus 510 to cause actuator 350 to move and key head 310 to change level.

While FIGS. 4, 5 and 6 illustrate exemplary mechanisms for moving actuator 350, in other implementations, various hardware components (e.g., electrical components, mechanical components, electromechanical components, etc.), software components, or combinations thereof, may be employed. Accordingly, it is to be understood that there are a multitude of possibilities to move actuator 350 to cause key head 310 to change level (e.g., rise or fall). In one implementation, actuator 350 may move based on an actuator mover, such as actuator mover 440. As described above, a user may provide a force (e.g., moving camera cover 190 or opening a clam-style device) that may be translated to a certain direction (e.g., by actuator mover 440) to move actuator 350. In another implementation, the actuator mover, such as actuator mover 530 (e.g., a motor) may provide a force to move actuator 350. In another implementation, depending on the orientation of device 100, actuator 350 may move based on gravity.

Additionally, there are a multitude of events that may trigger a mechanism (e.g., actuator mover 440 or actuator mover 530) to move actuator 350. That is, actuator 350 may move based on any operation or use of device 100. For example, a mode of device 100, such as a camera mode, a game mode, a media playing mode, or a recording mode may be an event that provides a basis to move actuator 350. Additionally, or alternatively, when a program (e.g., application software) is executed, certain data is accessed, and/or certain data is displayed on display 150, such events may provide a basis to move actuator 350. For example, when a user opens an application, searches for a telephone number in a telephone directory, and/or enters a set-up screen, these events may provide a basis to move actuator 350. Additionally, or alternatively, when a user uses one key, such activity may provide a basis to move actuator 350 associated with another key. For example, when a user uses a cursor key to highlight an object on display 150, this event may provide a basis to move actuator 350 of a selection key (e.g., an enter function). Additionally, or alternatively, when device 100 receives a telephone call, this event may provide a basis to move actuator 350. For example, actuator 350 of a key of function keys 140 may move (e.g., pop-up) so that a user may more readily answer the incoming telephone call. Given the above, it is apparent that other possibilities exist, and the events that trigger actuator 350 to move may depend on, for example, the type of the device and the functionality and utility the device provides to a user.

In other implementations, actuator 350 may be connected to other actuator components that may control the position of other keys. For example, each key of keypad 130 may be controlled simultaneously. In another implementation, a single actuator, such as actuator 350 may control the position of multiple keys simultaneously, such as keypad 130.

The foregoing description of implementations provides illustration, but is not intended to be exhaustive or to limit the implementations to the precise form disclosed. Modifications and variations are possible in light of the above teachings or may be acquired from practice of the teachings. For example, although a two position key having, for example a low position and a high position, has been described, in other embodiments, a two position key may have, for example, a medium position and a high position. For example, a key of keypad 130 may be multi-functional key. Thus, for example, the key may be in a medium position (e.g., level with the surrounding keys of keypad 130) when the key is used to enter text information. On the other hand, the key may be in a high position (e.g., above the surrounding keys of keypad 130) when the key is used to retrieve new voicemail messages. For example, when device 100 is connected to a network and new voicemail is received, the key of keypad 130 may pop-up. A user of device 100 may press the key to retrieve new voicemail messages.

Additionally, in other embodiments, actuator 350 may provide a key with more than two positions. For example, a key may be a three position key, such as a low position, a medium position, and a high position, depending on the functionality associated with the key. In one implementation, when the key is at a low position, key head 310 may be hidden (e.g., below a cover surface or a housing surface).

It should be emphasized that the term "comprises" or "comprising" when used in the specification is taken to specify the presence of stated features, integers, steps, or components but does not preclude the presence or addition of one or more other features, integers, steps, components, or groups thereof.

In addition, while a series of processes and/or acts have been described herein, the order of the processes and/or acts may be modified in other implementations. Further, non-dependent processes and/or acts may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, act, or instruction used in the present application should be construed as critical or essential to the implementations described herein unless explicitly described as such. Also, as used herein, the article "a", "an", and "the" are intended to include one or more items. Where only one item is intended, the term "one" or similar language is used. Further, the phrase "based on" is intended to mean "based, at least in part, on" unless explicitly stated otherwise.

Spatially relative terms, such as "beneath", "below", "lower", "above", "upper" and the like, may be used herein for ease of description to describe one element's or feature's relationship to another element or feature as illustrated in the figures. It will be understood that the spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein should be interpreted accordingly.

The term "connect" and variations thereof (e.g., connected or connection) may be direct or indirect. The terms "low", "middle", and "high" are used herein for ease of description to describe an element and a spatial distance of the element from another element. As used herein, the term "and/or" includes any and all combinations of one or more of the associated list items.

What is claimed is:

1. A device, comprising:
   a key having a key head, and
   an actuator configured to move and correspondingly change a position of the key head to a first key head position and to a second key head position, where a direction the key head is configured to move when changing the position of the key head to the first key head position and to the second key head position is perpendicular to a direction the actuator is configured to move and correspondingly change the position of the key head to the first key head position and to the second key head position, and when the key head is at the first key head position and pressed to a depressed position, the key cannot provide a connection with respect to an electrical interface, and when the key head is at the second key head position and pressed to the depressed position, the key can provide a connection with respect to the electrical interface, where the actuator is configured to move the key to the second position only when the key is relevant to an operation being performed by the device.

2. The device of claim 1, where the actuator changes the position of the key head to the first key head position by moving in a direction that is perpendicular to a direction the key head is configured to move when being depressed.

3. The device of claim 2, where the actuator changes the position of the key head to the second key head position by moving in a direction that is perpendicular to a direction that the key head is configured to move when being depressed.

4. The device of claim 1, where the operation includes one of a mode of the device, an execution of an application program, receiving a selection of another key, or receiving a telephone call.

5. The device of claim 1, where the actuator is configured to move:
   to a first actuator position when changing the position of the key head to the first key head position, and
   to a second actuator position when changing the position of the key head to the second key head position.

6. The device of claim 5, where the actuator is configured to move:
   in a first direction when changing the position of the key head to the first key head position, and
   in a second direction when changing the position of the key head to the second key head position,
   where the first direction is opposite to the second direction.

7. The device of claim 1, where the actuator is configured to change the position of the key head to the second key head position, in which the key head protrudes further away from a housing of the device than when the key head is at the first key head position.

8. The device of claim 1, where the operation includes one of accessing of data, displaying data on a display of the device, or receiving a selection of an object on the display.

9. A device, comprising:
   a key head configured to move in a first direction and a second direction; and
   an actuator configured to:
      move in a third direction and a fourth direction, the third direction and the fourth direction each being perpendicular to the first direction and the second direction, and
      change a position of the key head when the actuator moves,
   where the actuator is configured to move to a first actuator position or to a second actuator position, and when the actuator is at the first actuator position and the key head is pressed to a depressed position, the key head cannot provide a connection with respect to an electrical interface, and when the actuator is at the second actuator position and the key head is pressed to the depressed position, the key head can provide a connection with respect to an electrical interface, where the actuator is configured to move to the second actuator position only when the key head is relevant to an operation being performed by the device.

10. The device of claim 9, where the key head is configured to move to a first key head position when moving in the first direction, and to a second key head position when moving in the second direction.

11. The device of claim 10, where the key head is configured to move to the first key head position in correspondence to when the actuator moves to the first actuator position.

12. The device of claim 10, where the key head is configured to move to the second key head position in correspondence to when the actuator moves to the second actuator position.

13. The device of claim 10, where the key head protrudes further away from a housing of the device when at the second key head position than when the key head is at the first key head position.

14. The device of claim 9, further comprising:
an actuator mover configured to move the actuator to the first actuator position and to the second actuator position.

15. The device of claim 14, where the actuator mover is configured to move the actuator based on the operation, where the operation includes a camera mode of the device triggered by an opening of a camera cover.

16. A device, comprising:
a key including a key head, and
an actuator configured to change the position of the key head to a first key head position and to a second key head position, and when the key head is at the first key head position and pressed to a depressed position and when the key head is at the second key head position and pressed to the depressed position, the key can provide a connection with respect to an electrical interface, where the actuator moves, to change the position of the key head, in a direction perpendicular to a direction in which the key head changes position to the first key head position and to the second key head position.

17. The device of claim 16, where:
the key further includes a key leg, and the actuator comprises a guide track,
the key leg of the key connects to the guide track, such that when the actuator moves to a first actuator position, the key head correspondingly moves to the first key head position, and when the actuator moves to a second actuator position, the key head correspondingly moves to the second key head position.

18. The device of claim 16, where the actuator is configured to move:
in a first direction to change the position of the key head to the first key head position, and
in a second direction to change the position of the key head to the second key head position, where the first direction is opposite to the second direction.

19. A device, comprising:
a key including a key head, and
means for changing the position of the key head to a first key head position and to a second key head position, where the means for changing moves in a direction perpendicular to a direction in which the position of the key head moves to the first key head position and moves to the second key head position;
where when the key head is at the first key head position and pressed to a depressed position, the key cannot provide a connection with respect to an electrical interface, and where the means for changing the position of the key head to the second key head position only occurs when the key is relevant to an operation being performed by the device.

20. The device of claim 19, where when the key head is at the second key head position, the key can provide a connection with respect to an electrical interface.

* * * * *